(12) United States Patent
Veldkamp

(10) Patent No.: US 8,449,358 B2
(45) Date of Patent: May 28, 2013

(54) METHOD AND APPARATUS FOR REMOVING SKIN AND FAT FROM MEAT PARTS

(75) Inventor: Brent M. Veldkamp, Cumming, IA (US)

(73) Assignee: Stork Townsend Inc., Des Moines, IA (US)

( * ) Notice: Subject to any disclaimer, the term of this patent is extended or adjusted under 35 U.S.C. 154(b) by 1197 days.

(21) Appl. No.: 12/257,919

(22) Filed: Oct. 24, 2008

(65) Prior Publication Data

US 2009/0053987 A1   Feb. 26, 2009

Related U.S. Application Data

(62) Division of application No. 10/986,592, filed on Nov. 12, 2004, now Pat. No. 8,087,978.

(51) Int. Cl.
*A22B 5/16* (2006.01)

(52) U.S. Cl.
USPC ............................ 452/127; 452/125; 452/130

(58) Field of Classification Search
USPC ................. 452/125, 127–130, 135–136, 138
See application file for complete search history.

(56) References Cited

U.S. PATENT DOCUMENTS

| | | | |
|---|---|---|---|
| 2,455,831 A | 12/1948 | Townsend | |
| RE23,222 E | 4/1950 | Townsend | |
| 2,522,728 A | 9/1950 | Townsend | |
| 3,504,721 A | 4/1970 | Townsend | |
| 3,513,893 A | 5/1970 | Townsend | |
| 3,542,103 A | 11/1970 | Townsend | |
| 3,542,105 A | 11/1970 | Townsend | |
| 3,559,707 A | 2/1971 | Townsend | |
| 3,613,154 A | 10/1971 | Townsend | |
| 3,685,561 A | 8/1972 | Beasley | |
| 3,703,199 A | 11/1972 | Townsend | |
| 3,741,105 A | 6/1973 | Beasley | |
| 3,769,903 A | 11/1973 | Greider | |
| 3,844,207 A | 10/1974 | Townsend | |
| 3,931,665 A | 1/1976 | Townsend | |
| 4,292,710 A | 10/1981 | Townsend | |
| 4,606,093 A | 8/1986 | Townsend | |
| 4,628,806 A | 12/1986 | Murphy | |
| 4,670,943 A | 6/1987 | Townsend | |
| 4,730,368 A | 3/1988 | Townsend | |
| 5,350,334 A | 9/1994 | Holms | |
| 5,429,548 A | 7/1995 | Long et al. | |
| 5,533,927 A * | 7/1996 | Schill | 452/127 |
| 5,558,573 A | 9/1996 | Basile, II et al. | |
| 5,609,519 A | 3/1997 | Townsend | |
| 5,766,066 A | 6/1998 | Ranniger | |
| 6,129,625 A | 10/2000 | Cate et al. | |
| 6,213,863 B1 | 4/2001 | Basile, II et al. | |
| 6,277,019 B1 | 8/2001 | Veldkamp et al. | |
| 6,299,523 B1 | 10/2001 | Wonderlich et al. | |
| 6,357,346 B1 | 3/2002 | Townsend | |
| 6,558,242 B2 | 5/2003 | Veldkamp et al. | |
| 6,589,108 B2 | 7/2003 | Townsend | |
| 2003/0008607 A1 | 1/2003 | Long | |

\* cited by examiner

*Primary Examiner* — David Parsley

(74) *Attorney, Agent, or Firm* — Zarley Law Firm, P.L.C.

(57) ABSTRACT

An apparatus and method for removing skin and fat from meat parts, includes a toothroll assembly. The toothroll assembly includes a first section having an outer surface, and a second section having an outer surface. The first section is adapted to rotate at a first surface speed, and the second section is adapted to rotate at a second surface speed independently from the first surface speed.

15 Claims, 3 Drawing Sheets

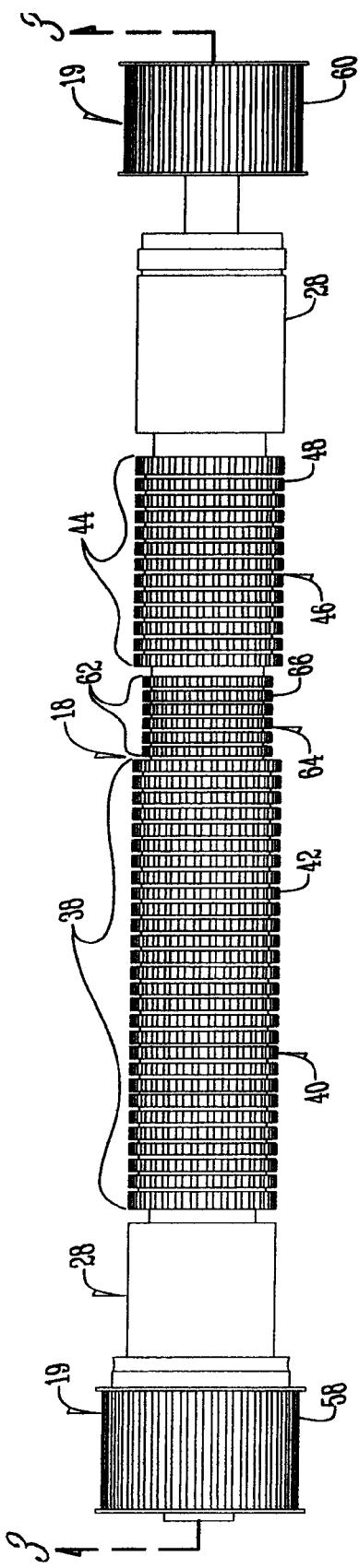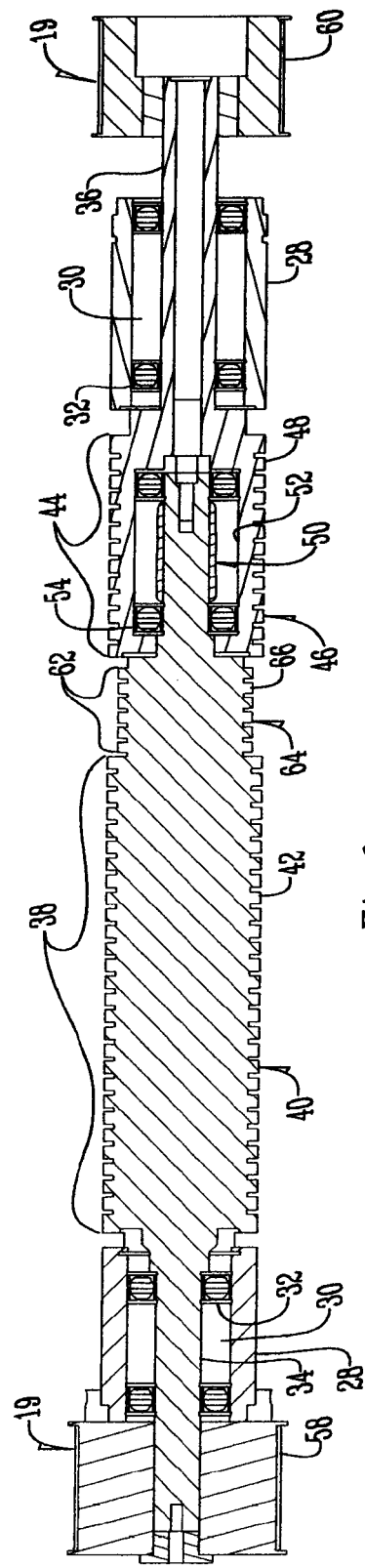

METHOD AND APPARATUS FOR REMOVING SKIN AND FAT FROM MEAT PARTS

This application is a division of U.S. Ser. No. 10/986,592 filed Nov. 12, 2004 now U.S. Pat. No. 8,087,978.

BACKGROUND OF THE INVENTION

This invention is directed toward a toothroll assembly for use in a trimming device for removing skin and fat from meat parts, and more particularly toward a toothroll assembly that has a first section adapted to rotate at a first surface speed and a second section adapted to rotate at a second surface speed to accommodate non-symmetric meat parts.

In the meat processing industry it is necessary and desirable to remove the skin and fat from a meat part, such as a pork leg, before separating the muscles for processing. To date, this has been done manually, using knives. Not only does this method require substantial labor, but it is also time consuming and creates safety hazards creating the potential for lacerations and cumulative trauma injuries. Alternatively, automated systems have been used to remove the skin and fat, but these conventional automated systems are unsuited for processing meat parts with certain shapes without leaving patches of skin and/or fat.

Specifically, it is difficult to remove the skin and fat from meat parts that are not flat. In particular, some meat parts have a roughly conical shape, i.e. pork legs. With current art, these meat parts are trimmed to remove skin and fat in layers using a toothroll, shoe and blade. The meat part rotates on the toothroll as the skin and fat are removed from the circumference of the meat part.

This conventional process works well for cylindrical shaped meat parts, but on conical shaped meat parts the skin and fat layer to be removed is longer on the end with the larger diameter and shorter on the end with the smaller diameter. The toothroll removes the skin and fat layer across the length of the meat part at a constant surface speed, so the end of the meat part with the smaller diameter rotates faster on the toothroll than the end of the meat part with the larger diameter, causing the meat part to twist, and adversely affect the trimming performance. Accordingly, a need exists in the art for an improved method and apparatus for removing skin and fat from a meat part.

Therefore, a primary objective of this invention is to provide a method and apparatus for removing skin and fat from a meat part that is more effective in trimming skin and fat from a meat part.

These and other objectives will be apparent to those skilled in the art based on the following disclosure.

SUMMARY OF THE INVENTION

The present invention involves an apparatus and method for removing skin and fat from meat parts, including a toothroll assembly. The toothroll assembly includes a first section having an outer surface with teeth extending outwardly therefrom, and a second section having an outer surface with teeth extending outwardly therefrom. The first section is adapted to rotate at a first surface speed, and the second section is adapted to rotate at a second surface speed independent from the first surface speed.

BRIEF DESCRIPTION OF THE DRAWINGS

FIG. 2 is a side elevation view of the toothroll assembly of this invention;

FIG. 3 is a side elevation cross-section view of the toothroll assembly of this invention taken along line 3-3 of FIG. 2.

DETAILED DESCRIPTION OF THE INVENTION

Figure 1:
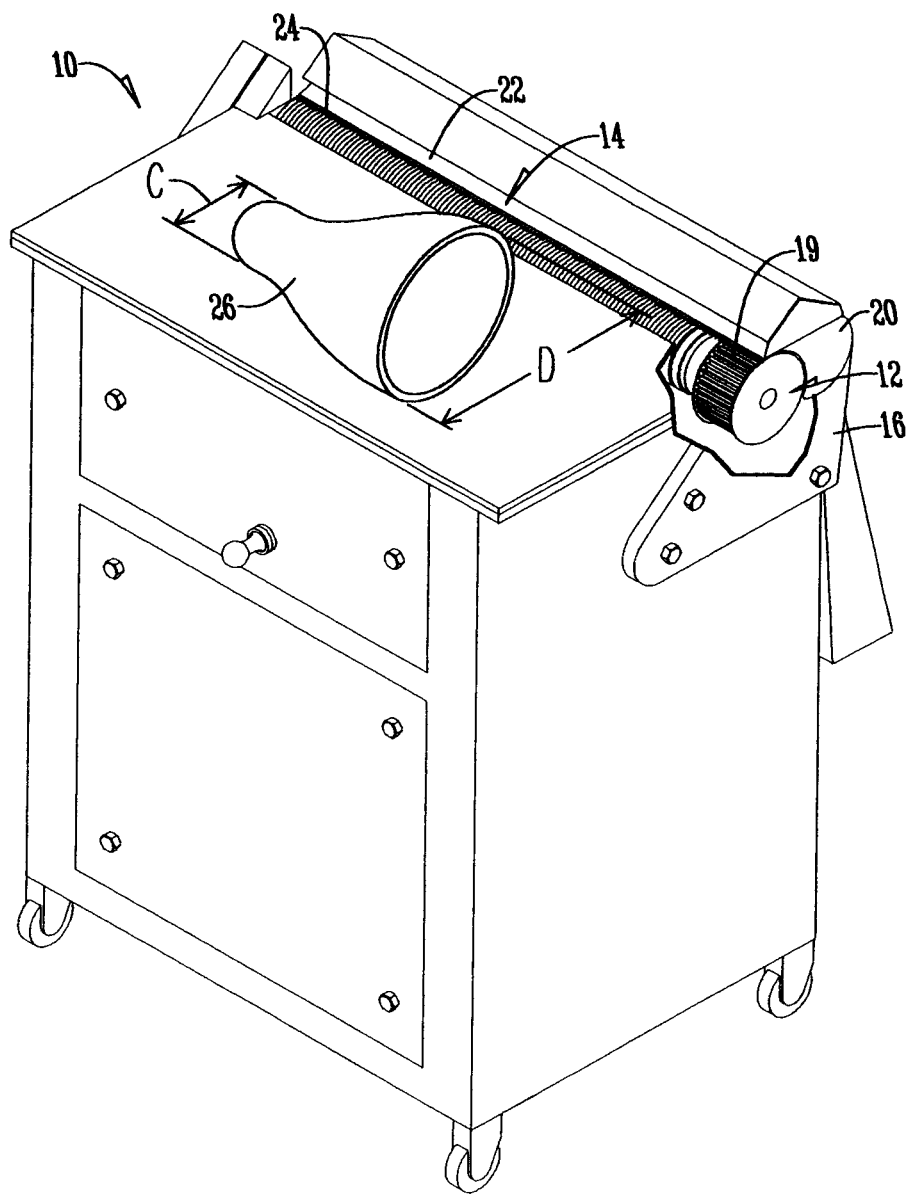
FIG. 1 is a perspective view of a skinning machine including the toothroll assembly of this invention.

Referring to FIG. 1, the skinning machine 10 of this invention has a toothroll assembly 12 and a trimming blade assembly 14. The toothroll assembly 12 is rotatably mounted to a frame 16. The toothroll assembly 12 includes a toothroll 18 that is driven by a drive mechanism 19. The drive mechanism 19 includes, but is not limited to, any conventional drive device such as by a pulley assembly (not shown) operatively connected to a power source (not shown).

The trimming blade assembly 14 is positioned in spaced relation to the toothroll 18. The trimming blade assembly 14 includes a shoe 20 with a blade clamp 22 attached thereto for receiving and holding a skinning blade 24. The skinning blade 24 is positioned between the shoe 20 and the clamp 22 such that blade 24 is adjacent the radial surface of the toothroll 18. The toothroll 18 assists in directing a layer of skin and fat of a meat part 26 between the shoe 20 and the toothroll 18. The toothroll 18, shoe 20, and skinning blade 24 remove the skin and fat from the meat part 26 and provide a pulling force to pull the layer of skin and fat toward the trimming blade assembly 14.

Referring to FIGS. 2 and 3, the toothroll 18 is rotatably associated with a pair of rotatable joints 28 positioned on each end of the toothroll 18. The rotatable joints 28 include housing 30 containing bearings 32 located on the ends of the toothroll 18. On one end of the toothroll 18, a first axle 34 extends from the toothroll 18 and is rotatably received within one of the housings 30. Likewise, on the opposite end of the toothroll 18, a second axle 36 extends from the toothroll 18 and is rotatably received within another housing 30.

The toothroll 18 itself has a first section 38 with an outer surface 40 with teeth 42 extending outwardly therefrom, and a second section 44 positioned adjacent the first section 38. Like the first section 38, the second section 44 has an outer surface 46 with teeth 48 extending outwardly therefrom.

Disposed within the second section 44 is a rotatable joint 50 that connects the first section 38 to the second joint 44 for independent rotation. The rotatable joint 50 includes an inner housing 52 located within the second section 44. The housing 52 contains bearings 54 that slidably engage a third axle 56 that extends from the first section 38 into the housing 52. Other mechanisms for forming a rotatable joint 50 between the first section 38 and second section 44 may be utilized without departing from the present invention. The independent rotation between the first section 38 and second section 44 allows the first section 38 to rotate at a first surface speed, while the second section 44 is rotated at a second surface speed independent from the first surface speed.

While the present invention has been described as utilizing housings (30, 52) containing bearings (32, 54) for rotatably engaging sections (38, 44) of the toothroll 18, it will be understood that other means to rotatably engage the sections (38, 44) of the toothroll 18 may be utilized in the present invention. For example, coaxial or multi-axial shafts, needle bearings, combinations thereof, or the like may be utilized in the present invention.

To actuate the first section 38 and second section 44 to rotate at independent surface speeds, the drive mechanism 19 is operatively associated to both the first section 38 and second section 44 for independent rotation of one another. One means for providing independent surface speeds between the first section 38 and second section 44 is by affixing a first pulley 58 to the first axle 34 extending from the first section 38, and affixing a second pulley 60 to the second axle 36 extending from the second section 44. The first pulley 58 and second pulley 60 have diameters sized to provide a ratio of the first surface speed to the second surface speed proportional to a corresponding diameter ratio on the meat part to be skinned (shown in FIG. 1 as a ratio of diameter C to diameter D on meat part 26). This proportional surface speed on the first section 38 and second section 44 allow a non-symmetric meat part 26 to rotate on the toothroll 18 without the meat part 26 twisting.

While the present invention has been described as utilizing a drive mechanism 19 having pulleys 58 and 60 of varying diameter, it will be understood that other means to drive the sections (38, 44) of the toothroll 18 may be utilized in the present invention. For example, concentric, coaxial, or multi-axial shafts driven from one end of the toothroll 18; gear reduction within the toothroll 18; combinations thereof; or the like may be utilized in the present invention.

Additionally, the rotation of the first section 38 and second section 44 by the drive mechanism 19 is alternatively or additionally accomplished with free rotation of the first section 38 and/or second section 44, driven rotation of the first section 38 and/or second section 44, intermittent rotation of the first section 38 and/or second section 44, and combinations thereof. For instance, free rotation or intermittent rotation of the second section 44, while the first section 38 is drivingly rotated at a given speed, also limits the twisting of meat part 26. Alternatively, the toothroll 18 is provided with more than two sections (38, 44) capable of driven rotation at multiple surface speeds.

A third section 62 of the toothroll 18 is positioned between the first section 38 and the second section 44. The third section 62 includes an outer surface 64 having means thereon for allowing the skin and fat layer to transition between a first surface speed on the first section 38 and a second surface speed on the second section 44. Such means include, but are not limited to, dulled teeth 66, a smooth surface (not shown) or the like.

Figure 4:
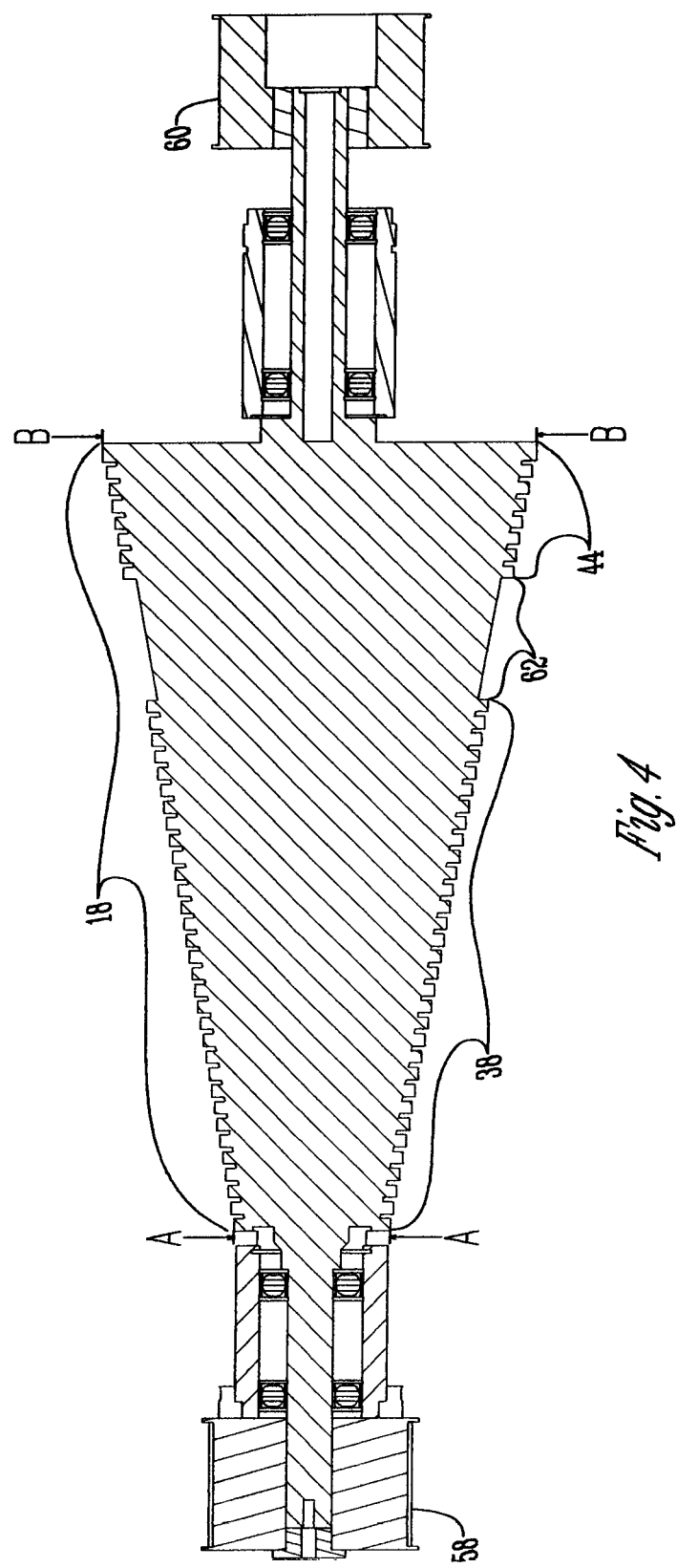
FIG. 4 is a side elevation cross-section view of another embodiment of the toothroll assembly of this invention.

Referring to FIG. 4, another embodiment of the toothroll assembly 12 of this invention is shown. In this embodiment, the first section 38 and second section 44 are connected in fixed relation to one another. As the first section 38 and second section 44 are connected, the desired ratio of the first surface speed to the second surface speed is accomplished through providing a larger diameter B outer surface to the second section 44 as compared to the diameter A of outer surface on the first section 38. With this fixed relation, the ratio of a diameter A of the outer surface of the first section 38 to the diameter B of the outer surface of the second section 44 is proportional to a corresponding diameter ratio on the meat part to be skinned (shown in FIG. 1 as a ratio of diameter C to diameter D on meat part 26). In this embodiment, only one pulley 58 is necessary.

Referring to FIGS. 3 and 4, the desired ratio of the first surface speed to the second surface speed can be accomplished through varying the axial rotational speed between the first section 38 and second section 44, or by varying the diameter A of the outer surface of the first section 38 from the diameter B of the outer surface of the second section 44. One of ordinary skill in the art will appreciate that the desired ratio of the first surface speed to the second surface speed can also be accomplished through simultaneously varying the axial rotational speed between the first section 38 and second section 44, and by also varying the diameter A of the outer surface of the first section 38 from the diameter B of the outer surface of the second section 44.

Additionally, while the toothroll 18 has been shown with sections thereof (38, 44) having a generally cylindrical shape (FIG. 3) or having a generally conical shape (FIG. 4), any suitable outer surface shape may be used without departing from the present invention. For example, the outer surface of the toothroll 18 and any section thereof (38, 44) may have a shape including but not limited to the following shapes: cylindrical, conical, convex, concave, hourglass, combinations thereof, or the like. Regardless of the chosen shape of the outer surface of the toothroll 18 and any section thereof (38, 44), the skinning blade 24 and shoe 20 of trimming blade assembly 14 are shaped to mate with the chosen outer surface of the toothroll 18.

Referring to FIGS. 1-4, in operation, during loading, the meat part 26 is placed on skinning machine 10 of this invention adjacent to the toothroll assembly 12 and a trimming blade assembly 14. The toothroll 18 is selectively driven by the drive mechanism 19 to pull the meat part 26 toward the trimming blade assembly 14 and rotate the meat part 26 relative to the trimming blade assembly 14. The first section 38 and second section 44 of the toothroll assembly 18 are simultaneously rotated. The first section 38 is rotated at a first surface speed while the second section is rotating at a second surface speed independent from the first surface speed. As described above, this variance between the first and second surface speed is accomplished through varying the axial rotational speed between the first section 38 and second section 44, by varying the diameter A of the outer surface of the first section 38 from the diameter B of the outer surface of the second section 44, or a combination thereof.

Accordingly, the present invention provides a method and apparatus for removing skin and fat from a meat part that is more effective in trimming skin and fat from a meat part. It is therefore seen that this invention will accomplish at least all of its stated objectives.

I claim:

1. A toothroll assembly for use with a device for removing fat and skin from a meat part, comprising:
   a first section having an outer surface, the first section adapted to rotate at a first surface speed; and
   a second section having an outer surface, the second section adapted to rotate at a second surface speed independent from the first surface speed.

2. The toothroll assembly of claim 1 wherein the first section and second section are connected by a rotatable joint to rotate independently of one another.

3. The toothroll assembly of claim 1 further comprising a drive mechanism operatively associated with the first section and second section, the drive mechanism adapted to rotate the first section at a first speed and the second section at a second speed independent from the first speed.

4. The toothroll assembly of claim 3, wherein the rotation of the first and second sections by the drive mechanism is selected from the group consisting of: free rotation, driven rotation, intermittent rotation, and combinations thereof.

5. The toothroll assembly of claim 1 wherein the ratio of the first surface speed to the second surface speed is proportional and inverse to a corresponding diameter ratio on the meat part to be skinned.

6. The toothroll assembly of claim 1 further comprising a third section positioned between the first section and the second section.

7. The toothroll assembly of claim 1 wherein the outer surfaces of the first section and the second section have a shape selected from the group consisting of: cylindrical, conical, convex, concave, hourglass, and combinations thereof.

8. The toothroll assembly of claim 1 wherein the first section and second section are connected in fixed relation to one another, and wherein a ratio of a diameter of the outer surface of the first section to the diameter of the outer surface of the second section is proportional and inverse of a corresponding diameter ratio on the meat part to be skinned.

9. A device for removing fat and skin from a meat part, comprising:
   a toothroll assembly having a first section with an outer surface, a second section having an outer surface, the first section adapted to rotate at a first surface speed, and the second section adapted to rotate at a second surface speed independent from the first surface speed; and
   a trimming blade assembly mounted to a frame positioned in spaced relation to the toothroll, the trimming blade assembly including a blade and a shoe, and wherein the blade and shoe are shaped to mate with the outer surfaces of the first section and the second section.

10. The device of claim 9 further comprising a drive mechanism operatively associated with the first section and second section, the drive mechanism adapted to rotate the first section at a first speed and the second section at a second speed different from the first speed.

11. The device of claim 10, wherein the rotation of the first and second sections by the drive mechanism is selected from the group consisting of: free rotation, driven rotation, intermittent rotation, and combinations thereof.

12. The device of claim 9 wherein the ratio of the first surface speed to the second surface speed is proportional and inverse to a corresponding diameter ratio on the meat part to be skinned.

13. The device of claim 9 further comprising a third section positioned between the first section and the second section, the third section having an outer surface.

14. The device of claim 9 wherein the outer surfaces of the first section and the second section have a shape selected from the group consisting of: cylindrical, convex, conical, concave, hourglass, and combinations thereof.

15. The device of claim 9 wherein the first section and second section are connected in fixed relation to one another, and wherein a ratio of a diameter of the outer surface of the first section to the diameter of the outer surface of the second section is proportional and inverse of a corresponding diameter ratio on the meat part to be skinned.

* * * * *